Nov. 27, 1956
B. J. FARROW
2,771,806
SCREW-CUTTING LATHES
Filed Feb. 11, 1954
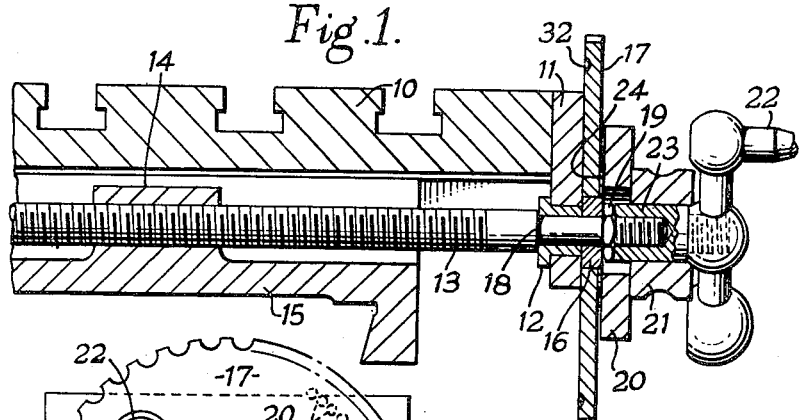
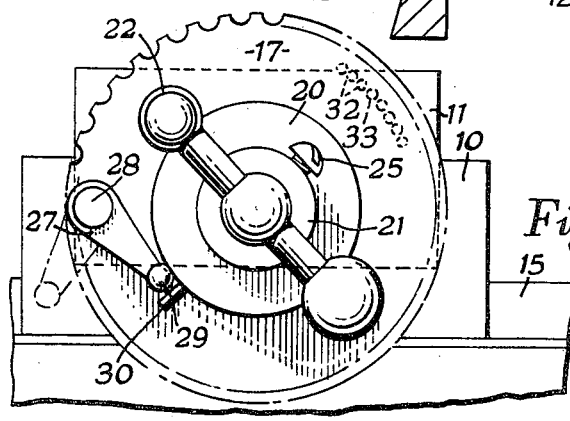
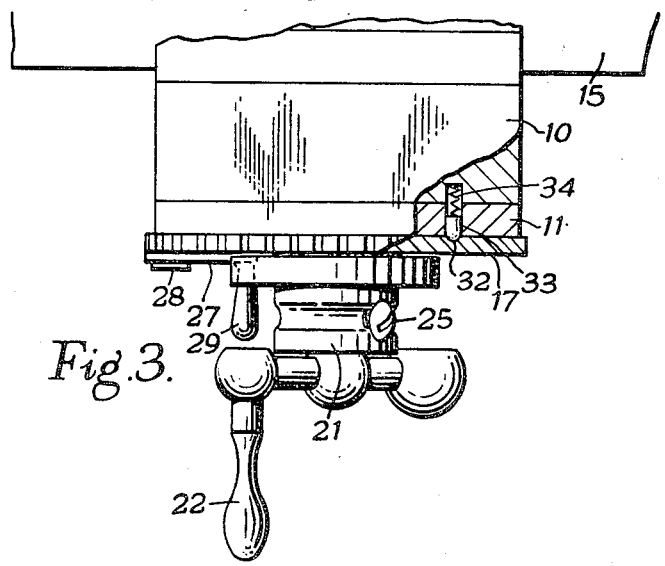
INVENTOR
BENJAMIN J. FARROW
BY Young, Emery &
Thompson
ATTORNEYS & 2,771,806
Patented Nov. 27, 1956

2,771,806
SCREW-CUTTING LATHES

Benjamin John Farrow, Cranborne, Wimborne, England

Application February 11, 1954, Serial No. 409,622

Claims priority, application Great Britain
February 11, 1953

2 Claims. (Cl. 82—24)

This invention relates to apparatus for use with lathes and its main object is to provide means for facilitating withdrawal and advance of the tool without losing the original setting. The invention is especially useful for screw-cutting so that the advance of the tool can be rapidly and exactly controlled.

According to the present invention the apparatus comprises a movable member movement of which brings the tool into and out of its cutting position, an abutment movable coincidently with said member, a stop located in the path of said abutment to locate it in its cutting position, and means for adjusting the tool and abutment to permit increase and decrease of the depth of cut.

By this arrangement it is possible to advance the tool for a definite depth of cut and at the end of the cut, the tool can be withdrawn so that the carriage can be returned, and the tool then advanced to precisely its former position by moving the abutment up to the stop whereupon a further definite advance can be effected or this may be effected if desired and the tool then advanced to the increased amount.

The invention will now be described by way of example with reference to the accompanying diagrammatic drawings wherein:

Figure 1 is a sectional view of a cross-slide and associated parts of a lathe made in accordance with the invention;

Figure 2 is a front view of the parts shown in Figure 1; and

Figure 3 is a plan view thereof but showing a detail in section.

The cross-slide 10 has a front plate 11 which carries a bush 12 forming a bearing for the feed screw member 13 which is threaded in the usual way in an internally threaded lug 14 on the saddle or carriage 15. Located against the front surface of the plate 11 is a rotary plate 17 which surrounds the screw member and is rotatable on a bush 16 also carried by the plate 11. The screw member is located on the bush by a shoulder 18 on one side and a nut 19 on the other side. The screw projects through the plate forwardly and carries the usual dial ring 20, block 21, and handle 22. The block 21 is fixed to an extension 23 of the screw member by a set screw 25. The ring 20 is integral with the block 21. A small washer 24 between the parts 17 and 20 prevents movement of the former by friction when rotating the ring 20.

An arm 27 is pivotally mounted on the plate 17 at 28 and this arm carries a stop pin 29. The ring 20 carries an abutment pin 30.

The plate 17 has an annular series of depressions 32 (graduated to represent thousandths of an inch in the advance of the tool) engageable by the rounded end of a pin 33 which is located in a recess in the plate 11 and is pressed towards the plate 17 by a spring 34, thus forming a sort of ball ratchet or step-by-step movable device to hold the rotary plate 17 in any of a number of positions.

In operation, the arm 27 is moved to bring the stop pin 29 into the path of rotation of the abutment pin 30, and the handle 22 is adjusted in usual manner to the first required depth of cut. During this rotary adjustment of the handle 22 the pin 30 engages the pin 29 so that the latter and the plate 17 are carried round with the handle. After ascertaining the depth for the first cut the handle 22 is rotated in the reverse direction any suitable but unknown extent not exceeding one revolution to withdraw the tool. The carriage 15 is then returned along the lathe bed to a position beyond the start of the cut. The plate 17 is rotated over the required number of depressions 32 according to the advance required for each successive cut. This will equally advance the stop pin 29. The handle 22 is then rotated in the advance direction until the abutment pin 30 again engages the stop pin 29 when the cross-slide 10 will automatically have been adjusted to the correct newly selected depth of cut position.

Instead of retracting the cross-slide 10 by a linear motion, the top slide may be mounted for movement about a vertical pivot so that it can be pivoted to retract the tool and then pivotally moved back to an adjustable stop corresponding to the pin 29.

I claim:

1. Apparatus for use with a lathe comprising a tool carrying cross-slide, a manually operated rotary screw member for moving the cross-slide to adjust depth of cut, a rotary disc member rotatable in both directions without limit and locatable in a definite rotary position with reference to the screw member co-axially therewith, a detent device acting between said rotary disc member and the cross-slide to locate the rotary disc member in any of a large number of rotary positions, whereby the operator can move said rotary disc member by hand to cause movement relative to said screw member and relative movement in said detent device to set said disc member, an abutment attached to said screw member, and a stop pivotally mounted on said plate and adapted to be moved around its pivot into the path of said abutment.

2. Apparatus for use with a lathe comprising a tool carrying cross-slide, a rotary screw member for moving the cross-slide to adjust depth of cut, a rotary disc member rotatable in both directions without limit and locatable in a definite rotary position with reference to the screw member co-axially therewith, the screw member projecting through said plate and carrying a handle on its front end, a detent device acting between said rotary disc member and the cross-slide to locate the rotary disc member in any of a large number of rotary positions, said detent device including depressions in said disc member and a round ended element carried by said cross-slide and a spring pressing said element into any of a number of depressions provided in said disc member, whereby the operator can move said rotary disc member by hand to cause movement relative to said screw member and relative movement between said round ended element and said depressions to an extent corresponding to any required number of said depressions to set said disc member, an abutment attached to said screw member, and a stop pivotally mounted on said plate and adapted to be moved around its pivot into the path of said abutment.

References Cited in the file of this patent

UNITED STATES PATENTS

| 789,660 | Keating | May 9, 1905 |
| 814,649 | Hanson | Mar. 6, 1906 |
| 1,768,495 | Schroder | June 24, 1930 |
| 1,799,311 | Moore | Apr. 7, 1931 |
| 2,362,275 | Jacobs | Nov. 7, 1944 |

FOREIGN PATENTS

| 25,550 | Austria | Sept. 10, 1906 |